(12) United States Patent
Pillalamarri et al.

(10) Patent No.: US 10,787,596 B2
(45) Date of Patent: Sep. 29, 2020

(54) REACTIVE HOT MELT ADHESIVE HAVING HIGH INITIAL STRENGTH, GOOD HEAT STABILITY AND LOW MONOMERIC DIISOCYANATE

(71) Applicant: H. B. Fuller Company, St. Paul, MN (US)

(72) Inventors: Sunil K. Pillalamarri, Rosemount, MN (US); Thomas F. Kauffman, Woodbury, MN (US)

(73) Assignee: H. B. Fuller Company, St. Paul, MN (US)

( * ) Notice: Subject to any disclaimer, the term of this patent is extended or adjusted under 35 U.S.C. 154(b) by 245 days.

(21) Appl. No.: 15/916,859

(22) Filed: Mar. 9, 2018

(65) Prior Publication Data

US 2018/0258330 A1    Sep. 13, 2018

Related U.S. Application Data

(60) Provisional application No. 62/469,030, filed on Mar. 9, 2017.

(51) Int. Cl.

| | |
|---|---|
| *C09J 175/08* | (2006.01) |
| *C09J 11/06* | (2006.01) |
| *C08K 5/00* | (2006.01) |
| *B32B 37/12* | (2006.01) |
| *C08K 5/544* | (2006.01) |
| *C08G 18/42* | (2006.01) |
| *C08G 18/18* | (2006.01) |
| *C09J 175/04* | (2006.01) |
| *C08G 18/40* | (2006.01) |
| *C08G 18/76* | (2006.01) |
| *C08G 18/48* | (2006.01) |
| *G01N 30/02* | (2006.01) |

(52) U.S. Cl.
CPC .......... *C09J 175/08* (2013.01); *B32B 37/1207* (2013.01); *C08G 18/1833* (2013.01); *C08G 18/4018* (2013.01); *C08G 18/42* (2013.01); *C08G 18/4854* (2013.01); *C08G 18/7671* (2013.01); *C08K 5/0016* (2013.01); *C08K 5/544* (2013.01); *C09J 11/06* (2013.01); *C09J 175/04* (2013.01); *B32B 2037/1215* (2013.01); *C08G 2170/20* (2013.01); *C08J 2300/22* (2013.01); *G01N 2030/027* (2013.01)

(58) Field of Classification Search
None
See application file for complete search history.

(56) References Cited

U.S. PATENT DOCUMENTS

| | | | |
|---|---|---|---|
| 5,441,808 A | 8/1995 | Anderson et al. | |
| 5,866,656 A * | 2/1999 | Hung | C08F 8/30 524/507 |
| 5,894,071 A | 4/1999 | Merz et al. | |
| 5,939,499 A * | 8/1999 | Anderson | C08G 18/10 525/440.08 |
| 6,355,317 B1 | 3/2002 | Reid et al. | |
| 6,498,210 B1 * | 12/2002 | Wang | C08G 18/10 156/329 |
| 7,691,479 B2 | 4/2010 | Schmatloch et al. | |
| 8,168,019 B2 | 5/2012 | Schwoeppe et al. | |
| 8,686,076 B2 | 4/2014 | Li et al. | |
| 9,023,946 B2 | 5/2015 | Suen et al. | |
| 9,212,300 B2 | 12/2015 | Paul et al. | |
| 2004/0010095 A1 * | 1/2004 | Kesselmayer | C08G 18/12 525/453 |
| 2004/0180155 A1 | 9/2004 | Nguyen-Misra et al. | |
| 2011/0207895 A1 | 8/2011 | Resenburg et al. | |
| 2016/0355713 A1 | 12/2016 | Tsuno et al. | |
| 2017/0369632 A1 * | 12/2017 | Pela | C08G 18/4825 |

FOREIGN PATENT DOCUMENTS

| | | | |
|---|---|---|---|
| WO | WO 1998/058003 | 12/1998 | |
| WO | WO 2011/109605 | 9/2011 | |
| WO | WO 2011/109629 | 9/2011 | |
| WO | WO 2013/016130 | 1/2013 | |
| WO | WO-2015129529 A1 * | 9/2015 | ............ C08L 75/04 |
| WO | WO 2016/142513 | 9/2016 | |
| WO | WO-2016142513 A1 * | 9/2016 | ......... C08G 18/4825 |

* cited by examiner

*Primary Examiner* — Christopher M Rodd
(74) *Attorney, Agent, or Firm* — Daniel S. Barta

(57) ABSTRACT

The invention includes a reactive hot melt adhesive composition including an isocyanate functional prepolymer derived from a polyfunctional isocyanate having a functionality of about 2 or more and a polyol, an active hydrogen organofunctional silane, an active hydrogen non-silane capping agent and a thermoplastic polymer.

20 Claims, No Drawings

REACTIVE HOT MELT ADHESIVE HAVING HIGH INITIAL STRENGTH, GOOD HEAT STABILITY AND LOW MONOMERIC DIISOCYANATE

This application claims priority to and benefit of provisional filed patent application No. 62/469,030 filed Mar. 9, 2017 and incorporated herein.

BACKGROUND

Conventional reactive polyurethane hot melt adhesives have been used in the past for a wide variety of adhesive applications.

Conventional reactive polyurethane hot melt adhesives are moisture crosslinking adhesives that are solid at room temperature and are applied at an elevated temperature as a melt. Cooling of the melt results first in a physical setting of the hot melt adhesive, followed by a chemical reaction of the isocyanate groups still present with moisture from the environment to form a cross-linked adhesive.

Conventional reactive polyurethane hot melt adhesives have many advantages including green strength and heat resistance but they often contain significant amounts of unreacted monomeric diisocyanates. This can cause problems when the adhesive is applied at an elevated temperature and vapors of the monomeric diisocyanates are formed. The vapors are toxic, irritating and can have a sensitizing effect.

Silane terminated reactive polyurethane hot melt adhesives can address this problem, but lack the heat stability necessary for roll coating applications.

SUMMARY

The inventors have found that a reactive polyurethane hot melt adhesive can be formulated in such a way so as to eliminate the presence of monomeric diisocyanates, maintain desirable properties such as initial (i.e. green) strength and heat resistance and have the heat stability necessary for roll coating applications.

In one aspect, the invention features a reactive hot melt adhesive composition including an isocyanate functional prepolymer derived from a polyfunctional isocyanate having a functionality of about 2 or more and a polyol; an active hydrogen organofunctional silane; an active hydrogen non-silane capping agent; and a thermoplastic polymer.

In another embodiment, the reactive hot melt adhesive composition has an isocyanate content of less than 0.1% by weight as measured by titration. In one embodiment, the reactive hot melt adhesive composition has a monomeric diisocyanate content of no greater than 0.002% by weight as measured by High-Performance Liquid Chromatography (HPLC) with UV detection in which the monomeric diisocyanate is derivatized with a chromophore prior to analysis. In a different embodiment, the equivalents ratio of silane reacted groups to non-silane reacted groups in the prepolymer is 1:5 to 5:1.

In one embodiment, the reactive hot melt adhesive composition further includes a tackifying agent. In another embodiment, the tackifying agent is selected from a group consisting of aromatic hydrocarbon resin, phenol modified resin, rosin ester resin, and silane modified aromatic resin.

In still another embodiment, the thermoplastic polymer is selected from the group consisting of polyether polyester block copolymer, polyurethanes and vinyl polymers. In a different embodiment, the reactive hot melt adhesive composition includes at least two different thermoplastic polymers. In another embodiment, the reactive hot melt adhesive composition includes a polyether polyester block copolymer and a vinyl polymer. In one embodiment, the reactive hot melt adhesive composition further includes a plasticizer.

In one embodiment, the prepolymer is a solid at room temperature. In another embodiment, the organofunctional silane is an amino silane.

In a different embodiment, the active hydrogen non silane capping agent is selected from the group consisting of hydroxyl functional oxazolidines, secondary amino functional alkanes, mono alcohols and mono thiols. In another embodiment, the active hydrogen non silane capping agent has a chain length of from 2 to 12 carbons.

In another embodiment, the reactive hot melt adhesive composition further includes a catalyst. In a different embodiment, the reactive hot melt adhesive composition has a Brookfield Viscosity at 162.7° C. of no greater than about 50,000 cP.

In one aspect, the invention features an isocyanate functional prepolymer derived from a polyfunctional isocyanate having a functionality of about 2 or more and a polyol, an active hydrogen organofunctional silane, an active hydrogen non-silane capping agent selected from the group consisting of hydroxyl functional oxazolidines and secondary amino functional alkanes; and a thermoplastic polymer selected from the group consisting of polyether polyester block copolymer and vinyl polymers, the reactive hot melt adhesive composition having a monomeric diisocyanate content of no greater than 0.002% by weight as measured by High-Performance Liquid Chromatography (HPLC) with UV detection in which the monomeric diisocyanate is derivatized with a chromophore prior to analysis.

In another embodiment, the invention features a method of joining at least two substrates, the method including roll coating the reactive hot melt adhesive composition onto a surface of a least a first substrate, and then contacting the roll coated adhesive composition with a second substrate. In a different embodiment the invention features an article made by the method. In one embodiment, the article is selected from the group consisting of a door, building panel, profile wrapped board, flooring laminate, and textile laminate.

DETAILED DESCRIPTION

Reactive Hot Melt Adhesive Composition

The invention includes a reactive hot melt adhesive composition including an isocyanate functional prepolymer derived from a polyfunctional isocyanate having a functionality of about 2 or more and a polyol, an active hydrogen organofunctional silane, an active hydrogen non-silane capping agent and a thermoplastic polymer.

The isocyanate groups of the isocyanate functional prepolymer are only partially reacted with the active hydrogen of the organofunctional silane. The remaining groups are capped (i.e. reacted with an active hydrogen non-silane capping agent). In one embodiment, essentially all of the remaining isocyanate group are capped.

The equivalents ratio of silane reacted groups to non-silane reacted groups is from about 1:5 to 5:1, from about 1:3 to about 3:1, or even from about 1:2 to about 2:1.

Before curing, the adhesive exhibits a melt viscosity of no greater than about 50,000 centipoise (cP), no greater than about 35,000 cP, no greater than about 20,000 cP, from about 500 cP to about 35,000 cP, or even from about 1,500 cP to about 20,000 cP at a temperature of about 162.7° C. (325° F.).

The reactive hot melt adhesive composition can have an isocyanate content of less than 1.0% by weight, less than 0.5% by weight, or even less than 0.1% by weight as measured by titration.

The reactive hot melt adhesive composition can have a monomeric diisocyanate content of no greater than 0.002% by weight, or even no greater than 0.001% by weight as measured by High-Performance Liquid Chromatography (HPLC) with UV detection in which the monomeric diisocyanate is derivatized with a chromophore prior to analysis.

The reactive hot melt adhesive composition has good green strength as witnessed by a Room Temperature Initial Overlap Shear of at least 500 kilopascal (kPa), or even at least 600 kPa.

The reactive hot melt adhesive composition has good roll coater stability as witnessed by the adhesive being able to remain gel free for at least 1 hour in air at 162.7° C. (325° F.) (Heat Stability Test).

Isocyanate Functional Prepolymer

The isocyanate functional prepolymer is derived from a polyfunctional isocyanate having a functionality of about 2 or more and a polyol.

In another embodiment, the isocyanate functional prepolymer is derived from a polyfunctional isocyanate having a functionality of about 2 or more, a polyol and an active hydrogen containing thermoplastic polymer (e.g. a thermoplastic polymer including OH groups).

In one embodiment, the isocyanate functional prepolymer is a solid at room temperature.

The isocyanate functional prepolymer is present in the composition at from about 10% by weight to about 50% by weight, or even from about 20% by weight to about 40% by weight.

Polyfunctional Isocyanate

The polyfunctional isocyanate has a functionality of about 2 or more. In one embodiment, the functionality can be 2. The isocyanate may be aromatic or aliphatic. Representative examples of aromatic isocyanates include diphenyl methylene diisocyanate (MDI), tetramethylxylylene diisocyanate, naphthalene diisocyanate, toluene diisocyanate. Representative examples of aliphatic diisocyanates include hexamethylene diisocyanate, isophorone diisocyanate, hydrogenated MDI, dodecane diisocyanate and polymeric isocyanates. In embodiments, the isocyanate can include MDI, tetramethylxylylene diisocyanate, isophorone diisocyanate, toluene diisocyanate, hexamethylene diisocyanate, xylene diisocyante or mixtures thereof. In an embodiment, the isocyanate is MDI.

Polyol

The polyol can include polyether polyols, polyester polyols, dimer acid based polyols or mixtures thereof. In one embodiment, the polyol is a solid. In another embodiment, at least one of the polyols is a polyester. The polyol can have a functionality of 2 or more, or even from about 2 to about 4.

The polyether polyol can include a polyoxyalkylene polyol wherein the alkylene is C2-9. Representative polyoxyalkylene polyols can include poly(alkyleneoxide) glycols wherein alkylene is C2-9 such as poly(1,2- and 1,3-propylene oxide) glycol, poly(tetramethylene oxide) glycol, poly(pentamethylene oxide) glycol, poly(hexamethylene oxide) glycol, poly(heptamethylene oxide) glycol, poly(octamethylene oxide) glycol, poly(nonamethylene oxide) glycol and poly (1,2-butylene oxide) glycol; random or block copolymers of ethylene oxide and 1,2-propylene oxide (used in proportions such that the carbon to oxygen mole ratio in the glycol exceeds 2.5) and poly-formals prepared by reacting formaldehyde with glycols, such as pentamethylene glycol, or mixtures of glycols, such as a mixture of tetramethylene and pentamethylene glycols. Additionally, the dicarboxymethyl acids of polyoxyalkylene polyols can be used to form long chain polyols in situ as is known by those skilled in the art.

In embodiments polytetramethylene ether glycol (PTMEG) can be used in the polyisocyanate prepolymer. PTMEG is commercially available from Invista (Wichita, Kans.) under the trade name TERATHANE®. In other embodiments, a triol such as e.g. polypropylene oxide-based triol ARCOL LHT-240 available from Covestro, LLC (Pittsburgh, Pa.) can also be used.

Polyester polyols contemplated for use in the prepolymer can include those that are reaction products of various polyols with aromatic or aliphatic dicarboxylic acids and polymers of lactones (e.g., polycaprolactone). Representative examples of the aromatic acids which may be used include teraphthalic acid, isophthalic acid and phthalic anhydride. Representative examples of aliphatic acids include dodecanedioic acid, sebacic acid, adipic acid and glutaric acid. Representative examples of polyols include ethylene glycol, butane diol, neopentylglycol, hexane diol, propylene glycol, dipropylene glycol, diethylene glycol and cyclohexane dimethanol. Commercially available polyester polyols that can be utilized can be obtained under the trade name DYNACOLL™ from Evonik Degussa GmbH (Essen, Germany) and STEPANPOL® from Stepan Company (Northfield, Ill.).

Dimer acid based polyols include bio-based polyester polyols, such as for example the PRIPLAST series of polyols available from Croda Inc. & Sederma, Inc. (Edison, N.J.).

Active Hydrogen Organofunctional Silane

Any active hydrogen organofunctional silane that includes at least one functional group (e.g., hydrogen) that is reactive with an isocyanate group of the polyurethane prepolymer, and has at least one silyl group can be used. Examples of useful silyl groups include alkoxysilyls, aryloxysilyls, alkyloxyiminosilyls, oxime silyls, and amino silyls. Preferred active hydrogen organofunctional silanes include, e.g., secondary amino-alkoxysilanes (e.g. methoxy aminosilanes) and mercapto-alkoxysilanes.

Examples of suitable aminosilanes include phenyl amino silanes (e.g. phenyl amino propyl trimethoxy silane), methyl amino propyl trimethoxy silane, n-butyl amino propyl trimethoxy silane, t-butyl amino propyl trimethoxy silane, cyclohexyl amino propyl trimethoxy silane, dibutyl maleate amino propyl trimethoxy silane, dibutyl maleate substituted 4-amino 3,3-dimethyl butyl trimethoxy silane, amino propyl triethoxy silane and mixtures thereof, specific examples of which include N-methyl-3-amino-2-methylpropyltrimethoxysilane, N-ethyl-3-amino-2-methylpropyltrimethoxysilane, N-ethyl-3-amino-2-methylpropyldiethoxysilane, N-ethyl-3-amino-2-methylpropyltriethoxysilane, N-ethyl-3-amino-2-methylpropylmethyldimethoxysilane, N-butyl-3-amino-2-methylpropyltrimethoxysilane, 3-(N-methyl-3-amino-1-methyl-1-ethoxy) propyltrimethoxysilane, N-ethyl-4-amino-3,3-dimethylbutyldimethoxymethylsilane, N-ethyl-4-amino-3,3-dimethylbutyltrimethoxysilane, bis-(3-trimethoxysilyl-2-methylpropyl)amine, N-(3'-trimethoxysilylpropyl)-3-amino-2-methylpropyltrimethoxysilane, N,N-bis[(3-triethoxysilyl) propyl]amine, N,N-bis [(3-tripropoxy-silyl)propyl]amine, N-(3-trimethoxysilyl) propyl-3-[N-(3-trimethoxysilyl)-propylamino]propionamide, N-(3-triethoxysilyl) propyl-3-[N-3-triethoxysilyl)-propyl-amino]propionamide, N-(3-trimethoxysilyl) propyl- 3-[N-3-triethoxysilyl)-propylamino]propionamide, 3-trimethoxysilylpropyl 3-[N-(3-trimethoxysilyl)-propylamino]-2-methyl propionate, 3-triethoxysilylpropyl 3-[N-(3-triethoxysilyl)-propylamino]-2-methyl propionate, 3-trimethoxysilylpropyl 3-[N-(3-triethoxysilyl)-propylamino]-2-methyl propionate, gamma-mercaptopropyl-trimethoxysilane and N,N'-bis((3-trimethoxysilyl)propyl) amine.

The active hydrogen organofunctional silane is present in the composition at from about 3% to about 25% by weight, or even from about 5% to about 20% by weight.

Useful commercially available aminosilanes include, e.g., aminosilanes available under the SILQUEST series of trade designations including, e.g., SILQUEST A-1170, SILQUEST A-1110, SILQUEST Y-9669 and SILQUEST A-15 from Momentive, under the DYNASYLAN series of trade designations including, e.g., DYNASYLAN 1189 N-(n-butyl)aminopropyltrimethoxysilane and DYNASYLAN MTMO 3-mercaptopropyl trimethoxy silane both of which are available from Degussa Corporation (Naperville, Ill.), and under the A-189 gamma-mercaptopropyltrimethoxysilane trade designation from Momentive.

Active Hydrogen Non Silane Capping Agent

The active hydrogen non silane capping agent is a component free of silane that includes an active hydrogen reactive group selected from the groups consisting of hydroxyl, amine, thiol and combinations thereof.

The active hydrogen non silane capping agent can be capable of reacting with only one isocyanate group. Alternatively, the active hydrogen non silane capping agent can be capable of reacting with 2 or more isocyanate groups. The active hydrogen non silane capping agent can be a liquid or a solid at room temperature.

The active hydrogen non silane capping agent can be selected from the group consisting of hydroxyl functional oxazolidines, secondary amino functional alkanes, mono alcohols, mono thiols, diols, triols, etc. The chain length of the active hydrogen non silane capping agent can be no greater than 100 carbon atoms, no greater than 40 carbon atoms, no greater than 20 carbon atoms, no greater than 8 carbon atoms, from 2 to 100 carbon atoms, or even from 2 to 20 carbon atoms.

In one embodiment, the active hydrogen non silane capping agent can include monofunctional, difunctional, or trifunctional alcohols that are crystalline (e.g. alkyl alcohols having from 20 to 100, or from 30 to 60, or from 40 to 50 carbon atoms). Useful crystalline alcohols have a melting point of from about 70° C. to about 100° C., or from about 80° C. to about 100° C.

In a different embodiment, the active hydrogen non silane capping agent can include tackifying agents that include non-phenolic hydroxyl groups (e.g. rosin esters with residual hydroxyl and acid functionality) or phenolic groups (e.g. terpene phenolic resins). In still another embodiment, the active hydrogen non silane capping agent can include phenoxy resins e.g. caprolactone-grafted phenoxy resins.

The non silane capping agent is present in the compositions at from about 1% by weight to about 15% by weight, from about 1% by weight to about 7% by weight, or even from about 2% by weight to about 6% by weight.

Useful commercially available non silane capping agents include dibutyl amine, 1-octanol, 1-octane mercaptan (n-octanethiol), butane diol, hexane diol, ARNOX 3, a hydroxyl ethyl oxazolidine available from Arnette Polymers, LLC (Richmond, Mo.), WESTREZ 5101, pentaerythritol ester of rosin available from DRT (Cedex, France), alcohols sold under the UNILIN series of trade designation, e.g., UNILIN 350, 425, 550 and 700, SYLVARES TP 2040, a phenol modified terpene resin available from Kraton Corporation (Savannah, Ga.), crystalline monofunctional alcohols available from Baker Petrolite (Sugar Land, Tex.) and PKCP-80, a medium low-Tg caprolactone-grafted phenoxy resin available from Gabriel Performance Products (Akron, Ohio).

Thermoplastic Polymer

The reactive hot melt adhesive composition includes a thermoplastic polymer. The thermoplastic polymer includes those polymers that do not include active hydrogen groups and thermoplastic polymers that are thermoplastic as individual components but include active hydrogen groups that allow the thermoplastic polymer to react with the urethane prepolymer.

When the thermoplastic polymer includes active hydrogen groups, the thermoplastic polymer can be added with the polyol and the polyisocyanate to form the isocyanate prepolymer.

The thermoplastic polymer helps to give the product initial (i.e. green) strength as it cools from the melt. In some embodiments, the reactive hot melt adhesive composition includes at least two different thermoplastic polymers.

The thermoplastic polymer can include vinyl polymers, polyether polyester block copolymers, polyether amide block copolymers, polyesters, acrylic polymers, styrene block copolymers including, e.g., A-B, A-B-A, A-(B-A)n-B, (A-B)n-Y, radial block copolymers and grafted versions thereof where the A block(s) is a polyvinyl aromatic block (e.g., styrene), and the B block is a rubbery midblock (e.g., isoprene, butadiene, ethylene-butylene, and ethylene-propylene) (e.g., styrene-butadiene-styrene block copolymers, styrene-isoprene-styrene block copolymers, styrene-ethylene-butylene-styrene block copolymers, styrene-ethylene-propylene-styrene block copolymers), polyurethanes, silane terminated versions of all the above, and mixtures thereof.

Vinyl polymers can include for example vinyl acetate-ethylene copolymers, ethylene-vinyl acetate copolymers, ethylene acrylic compounds including for e.g. ethylene acrylate copolymers, ethylene methacrylate, and ethylene butyl acrylate. Vinyl polymers utilized herein can include high vinyl acetate content ethylene-vinyl acetate copolymer. In embodiments, the ethylene-vinyl acetate copolymer can include 30 weight % to 60 weight % vinyl acetate, or even 40 weight % to 60 weight % vinyl acetate.

Acrylic polymers can include for example methacrylate copolymers e.g. methacrylate/n-butyl methacrylate copolymers The thermoplastic polymer can have a weight average molecular weight (Mw) as determined by GPC (Gel Permeation Chromotography) of the THF (Tetrahydrofuran) soluble portion of the polymer versus a polystyrene standard of from about 25,000 to about 350,000, or even from about 50,000 to about 300,000.

The thermoplastic polymer can be present in the adhesive in an amount of from about 5% by weight to about 40% by weight, from about 7% by weight to about 25% by weight, or even from about 10% by weight to about to about 20% by weight.

Useful commercially available thermoplastic polymers include, e.g., vinyl polymers available under the LEVAMELT line of ethylene-vinyl acetate copolymers from Lanxess Corporation (Pittsburgh, Pa.), polyester polyether copolymers available under the HYTREL 3078, HYTREL 4053, and HYTREL 4056 trade designations from E.I. DuPont de Nemours (Delaware), styrene-ethylene/butylene-styrene block copolymers available under the KRATON G series of trade designations including, e.g., KRATON G-1652 and G-1657, from Kraton Polymers (Houston, Tex.); styrene-butadiene-styrene and styrene-isoprene-styrene block copolymers available under the KRATON D series of trade designations including, e.g., KRATON D-1111 from Kraton Polymers; styrene-butadiene-styrene and styrene-isoprene-styrene block copolymers available under the VECTOR series of trade designations including, e.g., VECTOR 4114 and 4411 from Dexco Polymers (Houston, Tex.); acrylic and methacrylic polymers available under the ELVACITE (e.g. ELVACITE 2016) series of trade designations from Lucite International, a division of Mitsubishi Rayon Co. LTD (Tokyo, Japan); acrylic block copolymers available under the NANOSTRENGTH trade designation from Arkema (Kyoto, Japan); and thermoplastic polyurethanes e.g. ESTANE AG 8451 TPU and PEARLBOND 501 available from Lubrizol Advanced Materials, Inc. (Cleveland, Ohio)

Tackifying Agent

The reactive hot melt adhesive composition can include a tackifying agent without residual hydroxyl or acid functionality.

The tackifying agent can selected from the group consisting of aromatic hydrocarbon resins and rosin esters without residual hydroxyl and acid functionality. The aromatic hydrocarbon resin can be an aromatic or aromatic-aliphatic tackifying resin.

Useful aromatic hydrocarbon resins can be prepared or derived from any monomer containing an aromatic moiety and a polymerizable ethylenically unsaturated group. Typical examples of aromatic monomers can include styrenic monomers such as styrene, alpha-methylstyrene, vinyl toluene, methoxystyrene, tertiary butyl styrene, chlorostyrene, etc.; indene monomers such as indene, methyl indene, coumarone indene and others; and mixtures thereof. Aromatic-aliphatic tackifying resins can be prepared by polymerizing feed streams containing a mixture of one or more aliphatic monomers in combination with one or more aromatic monomers. Typically aromatic-aliphatic resins can be formed from the exemplary aromatic monomers above and unsaturated petroleum feedstocks which contain C4+ monomers. Exemplary mixed aromatic-aliphatic resins can contain C4-6 monomers with conjugated di-unsaturation. Typical monomers making up aliphatic hydrocarbon resins can include 1,3-butadiene, cis-1,3-pentadiene, trans-1,3-pentadiene, 2-methyl-1,3-butadiene, 2-methyl-2-butene, cyclopentadiene, and dicyclopentadiene for example.

Useful resins can be derived from C4-6 diene monomers, styrene monomers, indene monomers, dicyclopentadiene monomers, and combinations thereof. Exemplary tackifying resins can also be derived from styrene monomers, alpha-methylsytrene monomers, vinyl toluene monomers, methoxystyrene monomers, tertiary butyl styrene monomers, and combinations thereof.

Useful rosin ester resins includes rosin esters such as glycerol and pentaerythritol esters of natural and modified rosins including, e.g., glycerol esters of pale, wood rosin, glycerol esters of hydrogenated rosin, glycerol esters of polymerized rosin, and pentaerythritol esters of hydrogenated rosin.

The tackifying agent can be present in the composition at from about 5% by weight to about 60% by weight, at from about 10% by weight to about 50% by weight, or even at from about 25% to about 50% by weight.

Useful commercially available tackifying agents include KRISTALEX hydrocarbon resins, PLASTOLYN hydrocarbon resins, and ENDEX resins from Eastman Chemical Co. (Kingsport, Tenn.) and HIKOTACK P-10S available from Kolon.

Plasticizer

The adhesive can include a plasticizer. The plasticizer can be a solid or a liquid at room temperature.

Suitable plasticizers include, e.g., phthalates, benzoates, sulfonamides, epoxidized soybean oil and mixtures thereof. Useful sources of diisodecyl phthalate include those available under the trade designation JAYFLEX DIDP from Exxon Chemical. Useful dibenzoates are available under the trade designations BENZOFLEX 9-88, BENZOFLEX 50, and BENZOFLEX 352 from Eastman Chemical Co and also under the trade designation of K-FLEX from Emerald Kalama Chemical (Kalama, Wash.).

The plasticizer may be present in an amount of no greater than about 15% by weight, or even from about 5% by weight to about 15% by weight.

Catalyst

The adhesive can include a catalyst. Suitable catalysts facilitate the reaction between the polyol and polyisocyanate, hydrolysis, and/or the subsequent crosslinking reaction of the silane groups, isocyanate groups, or a combination thereof. Useful catalysts include, e.g., 2 2-dimorpholinodiethylether (DMDEE), tertiary amines including, e.g., N,N-dimethylaminoethanol, N,N-dimethyl-cyclohexamine-bis (2-dimethyl aminoethyl)ether, N-ethylmorpholine, N,N,N', N',N''-pentamethyl-diethylene-triamine, and 1-2 (hydroxypropyl) imidazole, and metal catalysts including, e.g., tin (e.g., dialkyl tin dicarboxylates, e.g., dibutyl tin dilaurate and dibutyl tin diacetate, stannous salts of carboxylic acids, e.g., stannous octoate and stannous acetate, tetrabutyl dioleatodistannoxane), titanium compounds, bismuth carboxylates, organosilicon titantates, alkyltitantates, and combinations thereof. The reactive hot melt adhesive composition can include more than one catalyst.

Other Components

The adhesive can optionally include other components including, for example, antioxidants, adhesion promoters, ultraviolet light stabilizers, catalysts, rheology modifiers, biocides, corrosion inhibitors, dehydrators, organic solvents, colorants (e.g., pigments and dyes), fillers, surfactants, flame retardants, waxes, silane modified tackifying agents, and mixtures thereof.

Methods of Making and Using

Substrates suitable for use with disclosed adhesive compositions can include for example glass, metal, polycarbonate, acrylic, ABS, PVC, vinyl, wood, etc. The disclosed adhesive compositions can also be advantageously utilized to manufacture laminated articles.

Laminated articles can be formed by roll coating. The invention further includes a method of joining at least two substrates, the method including roll coating the inventive adhesive composition onto a surface of a least a first substrate, and then contacting the roll coated adhesive composition with a second substrate.

The invention further features an article formed by the above method. The article can be selected from the group consisting of a door, building panel, profile wrapped board, flooring laminate, and textile laminate.

One example of a particular type of laminated article that can be advantageously manufactured using disclosed adhesive compositions is a door. Laminated doors can include three basic components: facings, core, and stiles/rails. Exemplary materials that can be used to make facings include for example wood veneer, wood, steel, fiberglass reinforced plastic (FRP), sheet molded compound (SMC), and high pressure laminates (HPL) that can themselves be made of a myriad of materials. Exemplary materials that can be used to make cores include for example expanded polystyrene (EPS), polyisocyanurate, extruded polystyrene (XPS), a honeycomb structure made of paper and aluminum, particle board (PB), medium density fiberboard (MDF), Agrifiber (any fibrous material generated from agricultural/bio-based products), and minerals such as gypsum. Exemplary materials that can be used to make stiles/rails include for example laminated veneer lumber (LVL), finger joints (FJ), hardwoods (such as oak for example), and composites that can be made of sawdust and polyethylene. A specific high density mineral composite material that is commercially available is TECTONITE™ from Warm Springs Composite Products (Warm Springs, Oreg.), TECTONITE™ can be obtained in sheet form, pre-cut stiles/rails, banded mineral door cores, raw mineral door cores, and concealed vertical rod stiles (CVRs).

EXAMPLES

Test Methods

Viscosity

Viscosity was determined on a Brookfield DV-II+ Viscometer equipped with Thermosel™ sample heater. A #27 spindle was used with the speed set to give a reading that was 20-80% of the scale. The adhesive sample was heated to the required temperature in an oven sealed in a small metal can. The spindle and adhesive chamber were preheated to the required temperature in the Thermosel™. The appropriate amount of molten adhesive was added to the chamber. The spindle was attached to the viscometer and set in motion. After 15-20 minutes, the viscosity reading was taken.

Heat Stability Test

Between 200 and 500 grams of adhesive was preheated to the required temperature in an oven. The adhesive was then placed on a Union Tool 66 cm wide heated roll coater and allowed to run at the specified temperature, exposed to ambient air in a temperature controlled building for 1 hour. At the end of 1 hour, a sample of adhesive was removed from the roll coater and its viscosity taken. The aged sample was also evaluated for gel.

Initial Green Strength

Initial Green Strength was determined by applying 0.1 milliliter (ml) of molten* adhesive to one side of a first 2.54 cm (1 inch) cubed oak wood cube and pressing one side of a second cube of the same size into the first. The cubes were held together by applying hand pressure for 30 seconds. The samples were then aged at room temperature for 10 minutes.
*(Comparative 2—applied at 121° C. (250° F.); Comparative 1 and all the Examples—applied at 162.7° C. (325° F.))

The samples were next pulled apart in tensile mode at 50.8 cm (20 inches)/minute using a Dillon Quality control force gauge BFG 1000N. The peak force required to pull the cubes apart was measured. The reported value is an average of three samples.

Overlap Shear Bond Preparation

The adhesive was pre heated* in a constant temperature oven. The adhesive was then poured into a roll coater and coated at a temperature of 135° C. onto a 3.81 cm (1.5 inch)×12.7 cm (5.0 inch)×1.91 cm (0.75 inch) piece of pine wood at a coat weight of 10-12.5 grams per square foot (gsf). A flame treated fiber reinforced plastic (FRP) substrate with a size of 6.35 cm (2.5 inch)×2.54 cm (1 inch)×0.318 cm (0.125 inch) was pushed onto the coated pine wood to form a 2.54 cm overlap bond. Thirty seconds after the adhesive was coated, the bonded substrates were passed through 60 psi nip roller 3 times.
*(Comparative 2—was pre heated at 121° C. (250° F.); Comparative 1 and all the Examples were preheated at 162.7° C. (325° F.))

Room Temperature Initial Overlap Shear Strength

Bonds were prepared according to the Overlap Shear Bond Preparation test method. After aging for 10 minutes, the overlap shear was placed into the Imada Tensile Tester with 1" FRP inserted into the shear module attached to the force gauge and the pine substrate clamped into the vise. Peak load for adhesive failure was recorded. The value recorded is the average of 3 bonds.

Elevated Temperature Aged Overlap Shear Strength

Bonds were prepared according to the Overlap Shear Bond Preparation test method. The bonds were allowed to cure for 4 weeks at 25° C. and 50% relative humidity. A 500 gram load was attached to the FRP substrate using metal clips. Test specimens with attached load were loaded in to an oven set at 100° C., and the amount of time to adhesive bond failure was recorded. The value recorded is the result of 1 bond.

Sample Preparation (Examples 1-3 and Comparative 1)

Step 1: Preparation of Polyurethane Prepolymer

The polyurethane prepolymer in all the examples was prepared by mixing polyols and MODAFLOW RESIN in a molten state under vacuum at a temperature of 120° C. for 1 hour. Molten MDI at 70° C. was then added and mixing continued under vacuum for 1-3 hours.

Step 2: Preparation of Final Adhesive

The thermoplastic polymer(s), plasticizer and tackifying agent were blended in a molten state at a temperature of 177° C. until uniform. The polyurethane prepolymer from step 1, pre-heated at 120° C., was then added and mixing under vacuum was continued for 1-3 hours, while lowering the temperature of whole mixture to 120° C. The catalyst and any additional materials e.g. secondary amino silane, dibtuyl amine, hydroxyethyl oxazolidine were then added and the adhesive was mixed for an additional 30 minutes to one hour.

Sample Preparation (Comparative 2)

To pre-heated polyurethane prepolymer made according to method above, catalyst (JEFFCAT DMDEE), SILQUEST A-15 and dibutyl amine were added and mixed at 120° C. for 1-3 hours.

The adhesive compositions were tested according to the test methods, and the results are listed in Table 1.

TABLE 1

| PREPOLYMER | Comparative 1 | Comparative 2 | Example 1 | Example 2 | Example 3 |
|---|---|---|---|---|---|
| TERATHANE 2000 | 6.80 | 20.48 | 6.97 | 8.01 | 7.21 |
| PIOTHANE 3500HD | 13.60 | 40.97 | 13.93 | 16.01 | 14.42 |
| Pure MDI | 5.95 | 17.93 | 6.10 | 7.01 | 6.31 |

TABLE 1-continued

| PREPOLYMER | Comparative 1 | Comparative 2 | Example 1 | Example 2 | Example 3 |
|---|---|---|---|---|---|
| HIKOTACK P110S | 39.00 | | 35.00 | 36.00 | 38.64 |
| LEVAMELT 456 | 6.00 | | | 5.00 | 5.00 |
| HYTREL 3078 | 11.00 | | | 14.00 | 13.00 |
| ESTANE AG8451 | | | 19.63 | | |
| BENZOFLEX 352 | 5.00 | | 8.00 | 5.00 | 5.00 |
| SILQUEST A-LINK 15 (amino butyl silane-unipodal) | | 14.69 | | | |
| SILQUEST Y9669 (amino phenyl silane-unipodal) | | | | 5.98 | |
| SILQUEST Y9627 (bipodal silane) | 12.44 | | 6.27 | | 9.00 |
| Dibutyl amine | | 5.92 | | | 1.36 |
| ARNOX 3 | | | 3.90 | 2.79 | |
| MODAFLOW RESIN | 0.01 | 0.01 | 0.01 | 0.01 | 0.01 |
| JEFFCAT DMDEE | 0.20 | 0.05 | 0.20 | 0.20 | 0.05 |
| Initial Viscosity @ 121° C. (cP) | | 1800 | | | |
| Initial Viscosity @ 162.7° C. (cP) | 8000 | | 1620 | 18,330 | 10,000 |
| Aged Viscosity (Heat Stability Test) @ 162.7° C. (cP) | gelled | | 4720 | 32,100 | 23,080 |
| Isocyanate content by titration (weight %) | <0.1 | <0.1 | <0.1 | <0.1 | <0.1 |
| Green Strength (Newtons) | 105.9 | 83.37 | 90.3 | 79.7 | 120.3 |
| Room Temperature Initial Overlap Shear (kPa) | | 481 (69.8 psi) | 905 (131.3 psi) | 729 (105.8 psi) | 970 (140.8 psi) |
| Elevated Temperature Aged Overlap Shear - 4 weeks cure (hours) | >24 | | <1 | >24 | >74 |

Other embodiments are within the claims.

What is claimed is:

1. A reactive hot melt adhesive composition comprising:
a prepolymer derived from a polyfunctional isocyanate having a functionality of about 2 or more and a polyol, an active hydrogen organofunctional silane, and an active hydrogen non-silane capping agent, the prepolymer having organofunctional silane groups and non-silane capping groups; and
a thermoplastic polymer,
the reactive hot melt adhesive composition having an isocyanate content of less than 0.1% by weight as measured by titration, and
exhibiting an overlap shear strength of at least 500 kPa when measured in accordance with the Room Temperature Initial Overlap Shear Strength.

2. The reactive hot melt adhesive composition of claim 1 having a first portion of isocyanate groups of the prepolymer reacted with the active hydrogen organofunctional silane, and substantially all the remaining isocyanate groups capped with the non-silane capping groups.

3. The reactive hot melt adhesive composition of claim 1 having a monomeric diisocyanate content of no greater than 0.002% by weight as measured by High-Performance Liquid Chromatography (HPLC) with UV detection in which the monomeric diisocyanate is derivatized with a chromophore prior to analysis.

4. The reactive hot melt adhesive composition of claim 1 wherein the equivalents ratio of silane reacted groups to non-silane reacted groups in the prepolymer is 1:5 to 5:1.

5. The reactive hot melt adhesive composition of claim 1 further comprising a tackifying agent.

6. The reactive hot melt adhesive composition of claim 1 wherein the thermoplastic polymer is selected from the group consisting of polyether polyester block copolymer, polyurethanes, vinyl polymers and acrylic polymers.

7. The reactive hot melt adhesive composition of claim 1 comprising at least two different thermoplastic polymers.

8. The reactive hot melt adhesive composition of claim 7 comprising a polyether polyester block copolymer and a vinyl polymer.

9. The reactive hot melt adhesive composition of claim 5 wherein the tackifying agent is an aromatic hydrocarbon resin.

10. The reactive hot melt adhesive composition of claim 1 further comprising a plasticizer.

11. The reactive hot melt adhesive composition of claim 1 wherein the prepolymer is a solid at room temperature.

12. The reactive hot melt adhesive composition of claim 1 wherein the organofunctional silane is an amino silane.

13. The reactive hot melt adhesive composition of claim 1 wherein the active hydrogen non silane capping agent is selected from the group consisting of hydroxyl functional oxazolidines, secondary amino functional alkanes, mono alcohols, diols, triols, thiols, non-phenolic hydroxyl group containing tackifying agents and phenol modified tackifying agents.

14. The reactive hot melt adhesive composition of claim 13 where the active hydrogen non silane capping agent has a chain length of from 2 to 12 carbons.

15. The reactive hot melt adhesive composition of claim 1, wherein the polyol is a polyester polyol.

16. The reactive hot melt adhesive composition of claim 1 having a Brookfield Viscosity at 162.7° C. of no greater than about 50,000 cP.

17. A reactive hot melt adhesive composition comprising:
a prepolymer derived from a polyfunctional isocyanate having a functionality of about 2 or more, a polyol, an active hydrogen organofunctional silane, and an active hydrogen non-silane capping agent; and
a thermoplastic polymer,
the reactive hot melt adhesive composition having a monomeric diisocyanate content of no greater than 0.002% by weight as measured by High-Performance Liquid Chromatography (HPLC) with UV detection in which the monomeric diisocyanate is derivatized with a chromophore prior to analysis, and exhibiting an overlap shear strength of at least 500 kPa when measured in accordance with the Room Temperature Initial Overlap Shear Strength.

18. A method of joining at least two substrates, the method comprising:
roll coating the reactive hot melt adhesive composition of claim 1 onto a surface of a least a first substrate, and then
contacting the roll coated adhesive composition with a second substrate.

19. The reactive hot melt adhesive composition of claim 17, a first portion of isocyanate groups of the isocyanate functional prepolymer are reacted with the active hydrogen of the organofunctional silane, and substantially all the remaining isocyanate groups are capped by reaction with the active hydrogen non-silane capping agent.

20. The reactive hot melt adhesive composition of claim 17, wherein the polyol is a polyester polyol.

* * * * *